US012733004B2

(12) United States Patent
Lunttila et al.

(10) Patent No.: US 12,733,004 B2
(45) **Date of Patent: *Sep. 8, 2026**

(54) UPLINK CONTROL SIGNALING IN CELLULAR TELECOMMUNICATION SYSTEM

(71) Applicant: Wireless Future Technologies Inc., Ottawa (CA)

(72) Inventors: Timo E. Lunttila, Espoo (FI); Kari P. Pajukoski, Oulu (FI); Esa T. Tiirola, Kempele (FI)

(73) Assignee: Wireless Future Technologies Inc., Ottawa (CA)

( * ) Notice: Subject to any disclaimer, the term of this patent is extended or adjusted under 35 U.S.C. 154(b) by 137 days.

This patent is subject to a terminal disclaimer.

(21) Appl. No.: 18/808,913

(22) Filed: Aug. 19, 2024

(65) Prior Publication Data

US 2024/0414718 A1 Dec. 12, 2024

Related U.S. Application Data

(63) Continuation of application No. 18/298,655, filed on Apr. 11, 2023, now Pat. No. 12,069,669, which is a (Continued)

(51) Int. Cl.

*H04W 72/21* (2023.01)
*H04B 7/02* (2018.01)

(Continued)

(52) U.S. Cl.

CPC ............ *H04W 72/21* (2023.01); *H04B 7/028* (2013.01); *H04B 7/0413* (2013.01);

(Continued)

(58) Field of Classification Search

CPC . H04W 72/04; H04W 72/0473; H04W 72/21; H04B 7/028; H04B 7/0413;

(Continued)

(56) References Cited

U.S. PATENT DOCUMENTS 7,715,806 B2 5/2010 Erceg
8,165,081 B2 * 4/2012 Papasakellariou .... H04L 5/0055 370/341

(Continued)

FOREIGN PATENT DOCUMENTS

CN 1362801 8/2002
CN 1540900 10/2004

(Continued)

OTHER PUBLICATIONS

Huawei, "Physical Layer Technologies for LTE-Advanced," 3GPP TSG RAN WG1#53, R1-081838, 8 pgs. (May 5-9, 2008).

(Continued)

*Primary Examiner* — Peter Chen
(74) *Attorney, Agent, or Firm* — Volpe Koenig

(57) ABSTRACT

A method, apparatus, and computer program for controlling allocation of control message fields in uplink transmission in a cellular telecommunication system are presented. Uplink control message fields are allocated to the resources of a physical uplink shared traffic channel according to an uplink transmission scheme selected for a user terminal. The control message fields are allocated so that transmission performance of the control messages is optimized for the selected uplink transmission scheme.

18 Claims, 3 Drawing Sheets

Related U.S. Application Data continuation of application No. 17/504,728, filed on Oct. 19, 2021, now Pat. No. 11,627,565, which is a continuation of application No. 16/236,853, filed on Dec. 31, 2018, now Pat. No. 11,153,854, which is a continuation of application No. 15/292,682, filed on Oct. 13, 2016, now Pat. No. 10,172,119, which is a continuation of application No. 14/246,537, filed on Apr. 7, 2014, now Pat. No. 9,490,879, which is a continuation of application No. 13/133,213, filed as application No. PCT/EP2008/067002 on Dec. 8, 2008, now Pat. No. 8,830,927.

(51) Int. Cl.

| | |
|---|---|
| ***H04B 7/0413*** | (2017.01) |
| ***H04B 7/06*** | (2006.01) |
| ***H04L 1/00*** | (2006.01) |
| ***H04L 1/08*** | (2006.01) |
| ***H04L 1/1607*** | (2023.01) |
| ***H04L 1/1829*** | (2023.01) |
| ***H04L 5/00*** | (2006.01) |
| ***H04W 72/04*** | (2023.01) |

(52) U.S. Cl.

CPC ............ *H04B 7/0697* (2013.01); *H04L 1/00* (2013.01); *H04L 1/0079* (2013.01); *H04L 1/0088* (2013.01); *H04L 1/009* (2013.01); *H04L 1/08* (2013.01); *H04L 1/1671* (2013.01); *H04L 1/1858* (2013.01); *H04L 1/1861* (2013.01); *H04L 5/0007* (2013.01); *H04L 5/0053* (2013.01); *H04L 5/0055* (2013.01); *H04L 5/0058* (2013.01); *H04W 72/04* (2013.01); *H04L 5/0042* (2013.01); *H04L 5/0048* (2013.01)

(58) Field of Classification Search

CPC ....... H04B 7/0697; H04L 1/00; H04L 1/0079; H04L 1/0088; H04L 1/009; H04L 1/08; H04L 1/1671; H04L 1/1858; H04L 1/1861; H04L 5/0007; H04L 5/0053; H04L 5/0055; H04L 5/0058; H04L 5/0042; H04L 5/0048

See application file for complete search history.

(56) References Cited

U.S. PATENT DOCUMENTS

| | | | | |
|---|---|---|---|---|
| 8,345,563 | B2 | 1/2013 | Oshiba et al. | |
| 8,457,152 | B2 | 6/2013 | Gorokhov et al. | |
| 2004/0076124 | A1 | 4/2004 | Agrawal et al. | |
| 2005/0068918 | A1 | 3/2005 | Mantravadi et al. | |
| 2005/0094603 | A1 | 5/2005 | Kim et al. | |
| 2006/0146867 | A1 | 7/2006 | Lee et al. | |
| 2007/0011550 | A1 * | 1/2007 | Agrawal | H04B 7/0697 714/746 |
| 2008/0032630 | A1 | 2/2008 | Kim et al. | |
| 2008/0095106 | A1 * | 4/2008 | Malladi | H04L 5/0092 370/329 |
| 2008/0095110 | A1 | 4/2008 | Montojo et al. | |
| 2008/0095252 | A1 | 4/2008 | Kim et al. | |
| 2008/0102846 | A1 | 5/2008 | Kim et al. | |
| 2008/0165743 | A1 | 7/2008 | Palanki et al. | |
| 2008/0165873 | A1 | 7/2008 | Ghosh et al. | |
| 2008/0188192 | A1 | 8/2008 | Chae et al. | |
| 2008/0212701 | A1 | 9/2008 | Pan et al. | |
| 2008/0253469 | A1 | 10/2008 | Ma et al. | |
| 2008/0285675 | A1 | 11/2008 | Roberts | |
| 2009/0073922 | A1 | 3/2009 | Malladi et al. | |
| 2009/0116589 | A1 | 5/2009 | Zhang et al. | |
| 2009/0129259 | A1 | 5/2009 | Malladi et al. | |
| 2009/0245170 | A1 | 10/2009 | Zhang et al. | |
| 2010/0002754 | A1 | 1/2010 | Lee et al. | |
| 2010/0029289 | A1 | 2/2010 | Love et al. | |
| 2010/0046445 | A1 | 2/2010 | Sawahashi et al. | |
| 2010/0135428 | A1 | 6/2010 | Yuda et al. | |
| 2010/0220683 | A1 | 9/2010 | Novak et al. | |
| 2011/0051671 | A1 | 3/2011 | Chung et al. | |
| 2011/0083066 | A1 | 4/2011 | Chung et al. | |
| 2011/0126071 | A1 | 5/2011 | Han et al. | |
| 2012/0188881 | A1 | 7/2012 | Ma et al. | |

FOREIGN PATENT DOCUMENTS

| | | |
|---|---|---|
| CN | 1829114 | 9/2006 |
| CN | 101005345 | 7/2007 |
| CN | 101123812 | 2/2008 |
| CN | 101150343 | 3/2008 |
| CN | 101150555 | 3/2008 |
| CN | 101212245 | 7/2008 |
| CN | 101222304 | 7/2008 |
| WO | 2008/014275 | 1/2008 |
| WO | 2008/086163 | 7/2008 |

OTHER PUBLICATIONS

Kim, "Codeword Scrambling for Multi-Stream Transmission in MIMO Channel," IEEE Vehicular Technology Conference, vol. 2, pp. 864-868 (May 30, 2005).

LG Electronics et al., "Finalizing the uplink control information multiplexing in PUSCH," 3GPP TSG RAN WG1#54bis, R1-083964, Prague, Czech (Sep. 29-Oct. 3, 2008).

LG Electronics, "PUSCH Multiplexing of Data, Control, and ACK/NACK Information," 3GPP TSG RAN WG1#51bis, R1-080267, 19 pgs. (Jan. 14-18, 2008).

Lge et al., "Correction of control MCS offset and SRS symbol puncturing," 3GPP TSG-RAN1 Meeting #55, R1-084600, Prague, Czech Republic (Nov. 10-14, 2008).

Nokia et al., "Channel Quality Indicator for LTE MU-MIMO," TSG RAN WG1 meeting #52, R1-080954, Sorrento, Italy (Feb. 11- 15, 2008).

Panasonic, "Consideration on Multicarrier Transmission Scheme for LTE-Adv Uplink," 3GPP TSG RAN WG1 Meeting #53bis, R1-082398, 3 pgs. (Jun. 30-Jul. 4, 2008).

TD Tech, "HS-SICH Structure for 1.28Mcps TDD MIMO," 3GPP TSG RAN WG1 Meeting #55, R1-084156, Prague, Czech Republic (Nov. 10-14, 2008).

Third Generation Partnership Project, "Technical Specification Group Radio Access Network; Evolved Universal Terrestrial Radio Access (E-UTRA); Physical channels and modulation" (Release 8), 3GPP TS 36.211 V8.4.0 (Sep. 2008).

Third Generation Partnership Project, "Technical Specification Group Radio Access Network; Evolved Universal Terrestrial Radio Access (E-UTRA); Physical layer procedures (Release 8)," 3GPP TS 36.213 V8.4.0 (Sep. 2008).

Third Generation Partnership Project, "Technical Specification Group Radio Access Network; Multiplexing and channel coding (FDD) (Release 8)," 3GPP TS 25.212 V8.3.0 (Sep. 2008).

Third Generation Partnership Project, "Technical Specification Group Radio Access Network; Evolved Universal Terrestrial Radio Access (E-UTRA); Multiplexing and channel coding (Release 8)," 3GPP TS 36.212 V8.4.0 (Sep. 2008).

* cited by examiner

TIME SLOT
SYMBOL
1 RESOURCE ELEMENT
SUBCARRIERS
DATA
RS
CQI
RI
ACK/NACK

400 START
402 SELECT UPLINK TRANSMISSION SCHEME
404 DETERMINE PUSCH RESOURCES
406 ALLOCATE CONTROL MESSAGE FIELDS TO PUSCH RESOURCES ACCORDING TO THE SCHEME SELECTED IN 402

SUB-CARRIER
11
10
9
8
7
6
5
4
3
2
1
0
= UPLINK DATA
=CONTROL MESSAGE FIELD

UPLINK CONTROL SIGNALING IN CELLULAR TELECOMMUNICATION SYSTEM

CROSS REFERENCE TO RELATED APPLICATIONS

This application is a continuation of U.S. patent application Ser. No. 18/298,655 filed on Apr. 11, 2023, which is a continuation of U.S. patent application Ser. No. 17/504,728 filed on Oct. 19, 2021, which issued as U.S. Pat. No. 11,627,565 on Apr. 11, 2023, which is a continuation of U.S. patent application Ser. No. 16/236,853 filed on Dec. 31, 2018, which issued as U.S. Pat. No. 11,153,854 on Oct. 19, 2021, which is a continuation of U.S. patent application Ser. No. 15/292,682 filed Oct. 13, 2016, which issued as U.S. Pat. No. 10,172,119 on Jan. 1, 2019, which is a continuation of U.S. patent application Ser. No. 14/246,537 filed Apr. 7, 2014, which issued as U.S. Pat. No. 9,490,879 on Nov. 8, 2016, which is a continuation of U.S. patent application Ser. No. 13/133,213 filed Jun. 14, 2011, which issued as U.S. Pat. No. 8,830,927 on Sep. 9, 2014, which is the national stage patent application of International Application No. PCT/EP2008/067002 filed Dec. 8, 2008, which are incorporated by reference as if fully set forth.

FIELD OF INVENTION

The invention relates to the field of cellular radio telecommunications and, particularly, to uplink signaling.

BACKGROUND

A communication system known as an evolved UMTS (Universal Mobile Telecommunication System) terrestrial radio access network (E-UTRAN, also referred to as UTRAN-LTE for its long-term evolution or LTE-A for long-term evolution-Advanced) is currently under development within the 3GPP. In this system, the downlink radio access technique will be OFDMA (Orthogonal Frequency Division Multiple Access), and the uplink radio access technique will be Single-Carrier FDMA (SC-FDMA) which is a type of a linearly pre-coded OFDMA. The uplink system band has a structure where a Physical Uplink Control Channel (PUCCH) is used for transferring uplink control messages, and a Physical Uplink Shared Channel (PUSCH) is used for transmission of uplink user traffic. Additional control messages may be transmitted in resources initially allocated to the PUSCH. The PUCCH carries uplink control information, such as ACK/NACK messages, channel quality indicators (CQI), scheduling request indicators (SRI), channel rank indicators, downlink pre-coding information, etc.

SUMMARY

According to an aspect of the present invention, there is provided a method of multiple-input multiple-output (MIMO) uplink transmission performed by a user terminal.

According to another aspect of the present invention, there is provided a user terminal capable of multiple-input multiple-output (MIMO) uplink transmission.

According to another aspect of the present invention, there is provided a non-transitory computer readable medium storing program instructions for execution by at least one processor.

BRIEF DESCRIPTION OF THE DRAWINGS

Embodiments of the present invention are described below, by way of example only, with reference to the accompanying drawings, in which.

DETAILED DESCRIPTION OF THE PREFERRED EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1A:
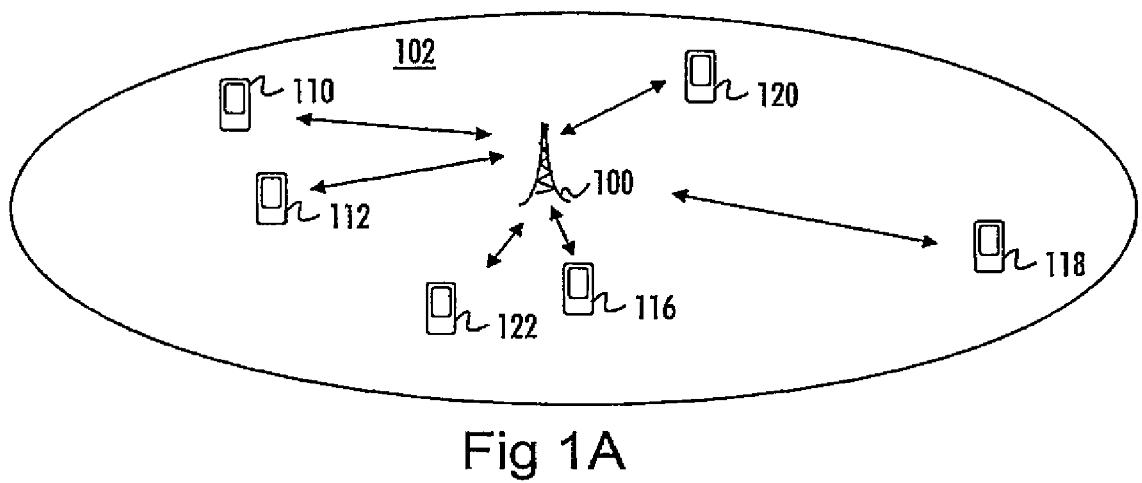
FIG. 1A illustrates a principle of cellular communications.
Figure 1B:
FIG. 1B illustrates an uplink system band structure in a modern UMTS system.

A general architecture of a cellular telecommunication system providing voice and data transfer services to mobile terminals is illustrated in FIGS. 1A and 1B. FIG. 1A illustrates a generic scenario of cellular communications where a base station 100 provides user terminals 110 to 122 with wireless communication services within a cell 102. The base station 100 may belong to a radio access network of a long-term evolution (LTE) or LTE-advanced (LTE-A) of the UMTS (Universal Mobile Telecommunication System) specified within 3GPP ($3^{rd}$ Generation Partnership Project) and, therefore, support at least OFDMA and SC-FDMA as radio access schemes for downlink and uplink, respectively. The base station is connected to other parts of the cellular telecommunication system, such as a mobility management entity (MME) controlling mobility of the user terminals, one or more gateway nodes through which data is routed, and an operation and maintenance server configured to control certain communication parameters, as is known in the art.

FIG. 1B illustrates a generic structure of an uplink system band allocated to a network operator for providing uplink communication services according to LTE Releases 8 and 9. The system band is structured such that a traffic channel, i.e. a physical uplink shared channel (PUSCH), is allocated in the middle of the system band and a control channel, i.e. a physical uplink control channel (PUCCH), is allocated to both edges of the traffic channel band. The size of the PUCCH band is configurable by the base station 100, and in certain network deployments the base station 100 may configure the utilization of the band such that the frequency resources at the edges of the system band are left blank. In current scenarios of the LTE system, uplink L1/L2 control signaling is divided into two classes in the LTE system: control signaling in the absence of UL data, which takes place on the PUCCH, and control signaling in the presence of UL data, which takes place on the PUSCH. PUCCH is a shared frequency/time resource reserved exclusively for user terminals transmitting only L1/L2 control signals. This description focuses on the PUSCH control signaling, wherein the PUSCH carries the uplink L1/L2 control signals in the case when the UE has been scheduled for data transmission.

Figure 2:
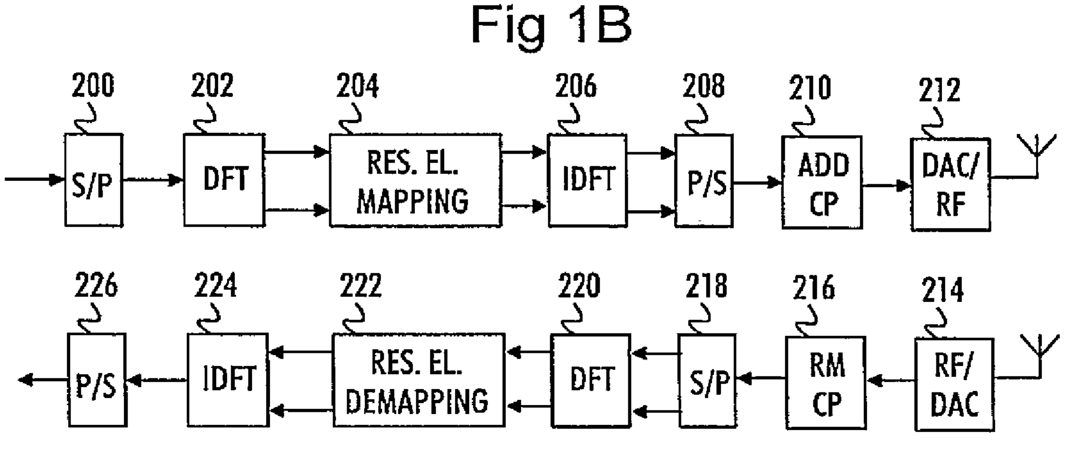
FIG. 2 illustrates transmitter and receiver structures for use in the cellular communications.

FIG. 2 illustrates very basic structures of an SC-FDMA transmitter (blocks 200 to 212) and an SC-FDMA receiver (blocks 214 to 226). It has been envisaged that future Releases of the LTE system utilize OFDM in uplink direction as well. The structure is well known to a person skilled in the field of modern telecommunication systems, so FIG. 2 will be described on a general level. In the SC-FDMA transmitter, modulated symbols to be transmitted are first transferred from a serial to parallel form in block 200, and transformed into a frequency domain through discrete Fourier transform (DFT) in block 202. Control and traffic data symbols are allocated to corresponding frequency resource elements in a resource element mapping block 204 according to a determined criterion. The resource element may be a sub-carrier or a virtual sub-carrier, which is the term widely used in the context of SC-FDMA transmission. Then, inverse DFT is calculated in block 206, the signal is converted from the parallel to serial form in block 208, a cyclic prefix is added in block 210, and the signal is transformed into an analog form and transmitted through radio frequency (RF) parts of the transmitter in block 212. In the receiver, the radio signal is received through an antenna and RF parts of the receiver in block 214 and the received signal is transformed into a digital domain. The cyclic prefix is removed in block 216, and serial-to-parallel conversion is performed in block 218 before DFT in block 220. The control and traffic data symbols are extracted from their resource elements in block 222 before the inverse DFT in block 224 and parallel-to-serial conversion in block 226.

It has been envisaged that the future LTE versions will support OFDM also in the uplink. For such a case, it is simple to modify the SC-FDMA transmitter and receiver structure to simply short-circuit DFT block 202 in the transmitter and inverse DFT block in the receiver to provide an OFDM transmitter and receiver. Accordingly, the transmitter may comprise a controller controlling short-circuiting of the DFT block 202, and the receiver may comprise a corresponding controller controlling short-circuiting of the inverse DFT block 224. Additionally, future user terminals will be equipped with capability to support single-user multiple-input-multiple-output transmission (SU-MIMO) in uplink, wherein the uplink transmission is multiplexed spatially to achieve higher data rates and better spectral efficiency. For that purpose, the transmitter and receiver structures of FIG. 2 will be modified to include one signal branch (FIG. 2 illustrates one branch) for each transmission/reception antenna and a signal processor carrying out signal processing according to the selected multi-antenna transmission scheme. The signal processor may be located practically at any location in the digital domain of the transmission/reception chain, which is obvious to one skilled in the art. The SU-MIMO transmission may be utilized together with either OFDM or SC-FDMA transmission.

For the sake of notation and to discriminate coded symbols mapped to each resource element from OFDM or SC-FDMA symbols carrying a plurality of coded symbols, both OFDM and SC-FDMA symbols can be seen as symbol blocks carrying a plurality of (modulated and channel-coded) symbols as information elements.

Figures 3, 4, 5A, 5B:
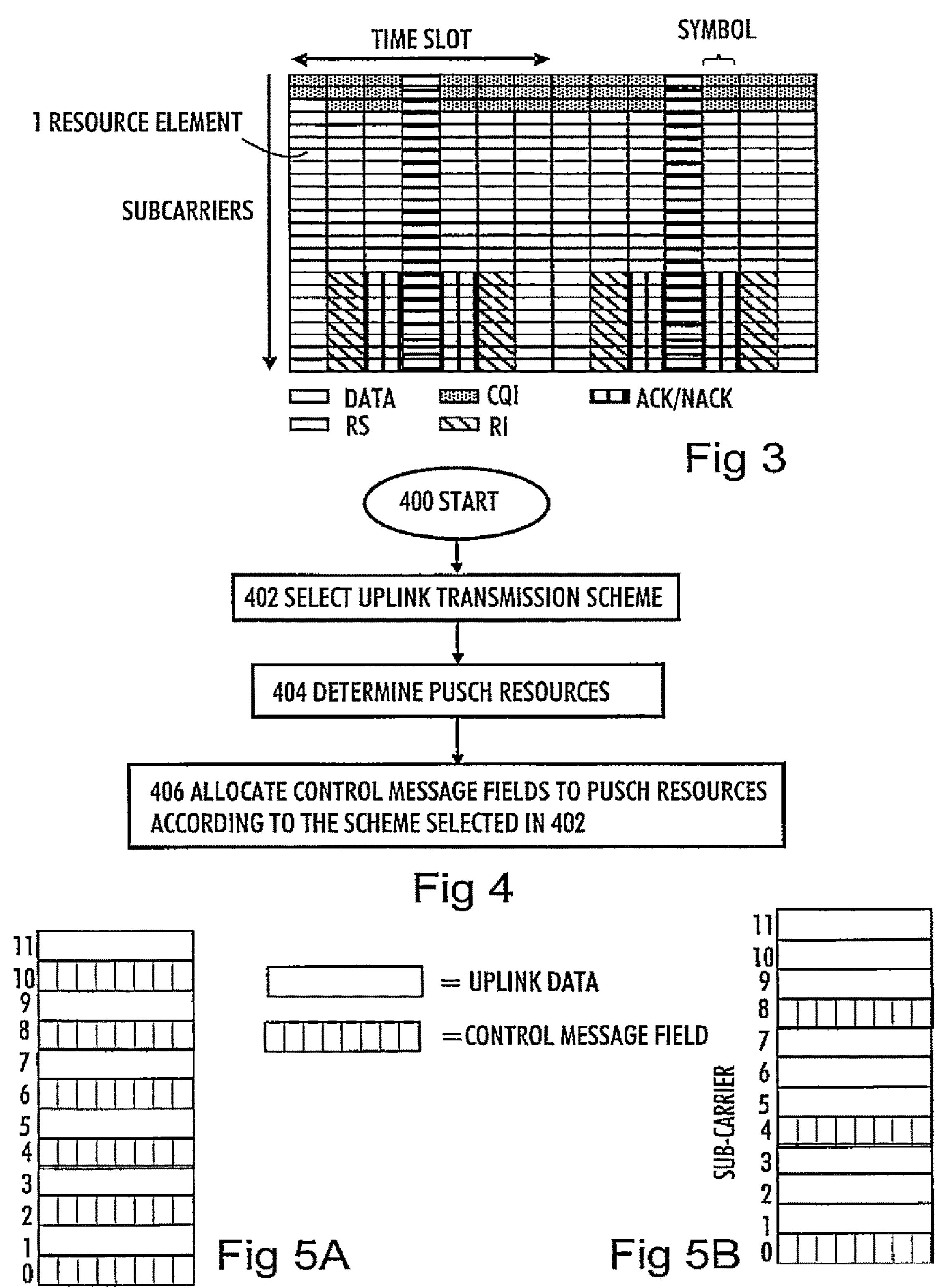
FIG. 3 illustrates current uplink signal structures in modern UMTS.
FIG. 4 is a flow diagram illustrating a process for carrying control message field allocation according to an embodiment of the invention.
FIGS. 5A and 5B illustrate effects of the control message field allocation according to an embodiment of the invention.

FIG. 3 illustrates a current uplink PUSCH sub-frame structure and allocation of control message fields to the PUSCH resources, i.e. a frequency resource block allocated to a given user terminal in a case when a cyclic prefix having a normal length is assumed. A time slot includes seven SC-FDMA symbols, and the sub-frame comprises two time slots. With an extended cyclic prefix, a time slot includes six SC-FDMA symbols. The actual mix of different L1/L2 control signals and their size vary from sub-frame to sub-frame. Both the user terminal and the base station have the knowledge about the number of symbols reserved by the control part, as will be described later. A reference signal (RS) is transmitted on every sub-carrier of the centermost symbol of a time slot. An acknowledgment message (ACK/NACK) indicating correct (ACK) or erroneous (NACK) reception of a downlink data packet is located on SC-FDMA symbols next to that conveying the RS so as to improve the reception quality of important ACK/NACK messages. The resource elements allocated to the ACK/NACK message are located at one end of the SC-FDMA symbol. A rank indicator indicating downlink channel rank may be allocated to the same sub-carriers as the ACK/NACK but on SC-FDMA symbols adjacent to those of the ACK/NAK. There are at maximum two SC-FDMA symbols per slot allocated to ACK/NACK signaling per (virtual) subcarrier. The same applies to the Rank Indicator. A channel quality indicator (COI) message field is allocated to the other end of the resource elements, and it may be transmitted using multiple SC-FDMA symbols.

At this stage it is noted that the term 'sub-carrier' refers to sub-carriers operated in block 204, while the term may not be most appropriate in the sense that the transmitted radio signal does not have the form of a multi-carrier signal. Therefore, the term "virtual sub-carrier" has also been used in the context of SC-FDMA transmission.

The structure illustrated in FIG. 3 is suitable for SC-FDMA transmission, because the DFT operation effectively spreads the contents of each sub-carrier over the frequency domain. However, in OFDM transmission the DFT operation is omitted and, as a consequence, the structure of FIG. 3 becomes sub-optimal due to the fixed and localized locations of the control message fields. In practice, this means that the sub-carriers are not spread over the frequency resource block and become susceptible to frequency-selective fading. If the frequencies of the sub-carriers carrying ACK/NACK messages attenuate heavily because of the fading, the whole ACK/NACK message is likely to be lost. Additionally, or alternatively, the SU-MIMO transmission scheme should be utilized effectively to improve the transmission performance of vital control messages in the uplink transmission.

FIG. 4 is a flow diagram illustrating a process for utilizing PUSCH resources for transmitting control messages according to an embodiment of the invention. The process may be carried out in the transmitter or the receiver, i.e. in the user terminal or in the base station, as will be described in greater detail below. The process starts in block 400. In block 402, an uplink transmission scheme is selected for the user terminal. In block 404, PUSCH resources are determined for the user terminal. In block 406, control message fields are allocated to the PUSCH resources determined in block 404 according to the transmission scheme selected in block 402.

The selection of the transmission scheme may comprise selection between OFDM and SC-FDMA transmission and between single-stream and multi-stream transmission. The selection may be carried out through selection of a channel rank which may automatically define the multi-antenna transmission method and the multiple access scheme (or uplink waveform). The selection of the uplink transmission scheme may be carried out by the base station, and the transmission scheme may be signaled to the user terminal in downlink signaling. The selection between the single-antenna and multi-antenna transmission scheme may be based on the channel rank indicator transmitted from the user terminal. The channel rank indicates the number of available spatial MIMO channels. Accordingly, block 402 includes selection of the uplink transmission scheme and indication of the transmission scheme to the user terminal when the process is executed in the base station. Similarly, block 404 includes scheduling of uplink PUSCH resources to the user terminal, signaling the allocated PUSCH resources to the user terminal, and configuring a receiver of the base station to receive the uplink transmission of the user terminal from the allocated PUSCH resources. Block 406 includes determining a pattern for data and control message fields in the allocated PUSCH resources and configuring the receiver to receive the data and the control messages accordingly.

When executed in the user terminal, block 402 includes deduction of the uplink transmission scheme from a control message received from the base station, block 404 includes deduction of the uplink PUSCH resources allocated to the user terminal from a control message received from the base station, and block 406 includes determining a pattern for the data and control message fields in the allocated PUSCH resources and configuring the transmitter to transmit the data and the control messages accordingly.

When the selected uplink transmission scheme is SC-FDMA, the control message fields may be allocated in a conventional manner, as illustrated in FIG. 3. In other words, the sub-carrier mapping of control message fields may be carried out such that the control message fields are localized with respect to the allocated PUSCH resource. The DFT then spreads the sub-carriers over the allocated frequency resource. On the other hand, when the selected uplink transmission scheme is OFDM, symbols of each control message field are distributed over the PUSCH frequency resources of the user terminal. Accordingly, each control message field becomes distributed along the frequency spectrum allocated to the user terminal, which results in better tolerance against frequency-selective fading compared with using the structure of FIG. 3 with OFDM transmission.

The transmission scheme is typically selected by the base station. The base station may first select the applied multi-antenna transmission scheme: spatial multiplexing through a plurality of spatially parallel transmission streams or beamforming or transmit diversity transmission through a single stream (single-input-multiple-output, SIMO). The selection may be made on the basis of the uplink channel rank, i.e. the number of uncorrelated uplink spatial sub-channels. When the base station selects the spatial multiplexing as a multi-antenna transmission scheme, the base station also selects the number of spatially parallel uplink sub-streams. Then, the selection between the OFDM and SC-FDMA may be made on the basis of the selected multi-antenna transmission scheme: OFDM for spatial multiplexing and SC-FDMA for single-stream beamforming or SIMO. However, embodiments of the invention described below are not limited to this type of selection of the transmission scheme, and SC-FDMA (or OFDM) may be used for all multi-antenna transmission schemes. The transmission scheme (multi-antenna scheme and multi-access scheme) may be determined in the user terminal by dynamic scheduling grants, e.g. downlink control information (DCI) Format 0), signaled from the base station to the user terminal in downlink signaling. The signaling may be carried out explicitly by using at least one signaling bit indicating whether or not to use spatial multiplexing. Then, the user terminal implements either spatial multiplexing with OFDM or beamforming with SC-FDMA. Alternatively, the base station may signal the transmission scheme implicitly by transmitting an uplink rank indicator. If the rank indicator indicates a channel rank higher than one, the user terminal implements either spatial multiplexing with OFDM. Otherwise, the user terminal implements beamforming with SC-FDMA. In a yet alternative embodiment, the transmission scheme may be signaled through higher layer (L3) signaling as a user-terminal specific or cell-specific parameter. If the user terminal supports only a fixed transmission scheme, then no explicit signaling is necessary, and the transmission scheme is applied according to the capabilities of the user terminal.

FIGS. 5A and 5B illustrate two examples of the distribution of a control message field over the frequency resource. In both FIGS. 5A and 5B, the control message field is distributed (or 'interleaved', which is a term commonly used in this context in OFDM transmission) evenly over the sub-carriers. In other words, control symbols of the control message field are mapped to the subcarriers with a frequency-spacing between the control symbols, wherein the spacing is defined by a repetition factor selected for each control message field to define a number of symbols other than the control symbols of the control message field between the control symbols of the control message field. The frequency-spacing between the control symbols of the same control message field may be equal to all control symbols of the control message field in question. FIG. 5A illustrates mapping with a repetition factor two, i.e. the symbols of the control message field are mapped to every second sub-carrier. FIG. 5B illustrates mapping with a repetition factor four, i.e. the symbols of the control message field are mapped to every fourth sub-carrier. Different repetition factors may be determined according to the size of the resource block allocated to the user terminal, sizes of the control fields, etc. Naturally, the symbols of the control message field are mapped with the repetition factor only to the extent that no more control symbols exists to map.

The distribution of a given control message field to the allocated resources may comprise first dimensioning the size of the control message field, then determining the repetition factor and a starting position sub-carrier index and then mapping symbols of the control message to the corresponding sub-carriers. This is illustrated in FIG. 6 illustrating an embodiment of block 404. The flow diagram of FIG. 6 illustrates mapping of control message fields to the allocated PUSCH resource. The process of FIG. 6 describes mapping of two control channel fields (CQI and ACK/NACK), but it can easily be expanded to cover other control message fields, as becomes obvious from the description below. In block 502, the number of symbols allocated to each control channel field ($N_x$) is determined according to the following equation:

$$N_x = \left\lceil \frac{O \cdot \text{offset} \cdot M_{SC}^{PUSCH} M_{symb}^{PUSCH}}{K_{bits}^{PUSCH}} \right\rceil, \tag{1}$$

where ⌈ ⌉ denotes rounding operation to the nearest supported integer towards plus infinity, O is the number of bits to be transmitted, e.g. the length of a CQI word, $$M_{SC}^{PUSCH}$$

is the number of sub-carriers carrying PUSCH in the allocated frequency resource (received from the base station on physical downlink control channel, PDCCH), $$M_{symb}^{PUSCH}$$

is the number of multi-carrier symbols (OFDM symbols) carrying PUSCH per sub-frame (received from the base station on PDCCH), and $$K_{bits}^{PUSCH}$$

is the total number of transmitted bits on the PUSCH. The term 'offset' is a quality offset defining an offset between desired reception qualities of traffic data and control data transferred in the control message field. The offset may be different for different control message fields, but it may also be made dependent on the selected transmission scheme. For example, if the spatial multiplexing is selected as the transmission scheme, 'offset' may be set to have a higher value than in the case of single-stream beamforming transmission or spatial transmission diversity, where higher reliability of transmission is inherently obtained. The quality of the transmission of traffic data is determined according to the service type of the data transferred, and the modulation and coding scheme and other parameters of the PUSCH are configured to meet these quality requirements. In practice, the modulation scheme may be the same for all symbols transmitted on the PUSCH, as in the current specifications of the LTE-A, but the channel coding scheme of the control message field may be selected on the basis of the 'offset'. Typically, certain control messages, such as ACK/NACK messages, are less tolerant to errors and require higher reception quality in terms of block error rate (BLER), for example, and the PUSCH parameters do not automatically meet these demands. The term 'offset' is used in Equation (1) to ensure that the modulation and coding scheme selected for the control message field ensures the desired higher reception quality, and the actual value of 'offset' is determined according to the difference between the quality (BLER) of the traffic data and the required quality (BLER) of the control message type. These values of 'offset' are typically predetermined and stored as dependent on the selected uplink transmission scheme. The higher the value of the 'offset' is, i.e. the higher the difference between the required qualities of the traffic data and the control data, the higher number of symbols is allocated to the control message field and the stronger channel coding is applied to the control message field (and vice versa). Therefore, calculation of Equation (1) is carried out before modulation and channel coding of the control message bits. As mentioned above, equation (1) is calculated for each control message type (CQI and ACK/NACK in this example). Equation (1) is actually a modification of an equation defined in current 3GPP specification, and the modification is the term 'offset'.

In block 504, a repetition factor RPF is calculated for the CQI message field according to the following equation:

$$RPF_{CQI} = \left\lfloor \frac{N}{N_{CQI}} \right\rfloor \tag{2}$$

where N is the total number of subcarriers allocated to the user terminal within a sub-frame and $N_{CQI}$ is the number of CQI symbols to be transmitted in the sub-frame. ⌊ ⌋ denotes floor operation, i.e. rounding to the nearest integer towards minus infinity. The calculation and utilization of the repetition factor ensures that the CQI will be distributed (or interleaved) over the allocated frequency spectrum. Then, the repetition factor RPF is calculated for ACK/NACK message field according to the following equation:

$$RPF_{AN} = \left\lfloor \frac{N - N_{CQI}}{N_{AN}} \right\rfloor \tag{3}$$

where $N_{AN}$ is the number of ACK/NACK symbols to be transmitted in the sub-frame. Since the number of CQI resource elements (or symbols) to be transmitted is reduced from the total number of resource elements, the repetition factor $RPF_{AN}$ is calculated by taking into account logically available resource elements after the CQI. In this manner, repetition factors for further control message fields (rank indicator, pre-coding matrix indicator, etc.) may be calculated by reducing the number of allocated resource elements from the total number of resource elements N before the division by the number of symbols or resource elements to be used for the particular control message field in question. In block 508, different starting position resource elements are selected for different control message fields so that the resource elements mapping is started from different resource elements by using the allocated repetition factor. The repetition factor may vary between 0 and RPF-1. In block 510, control symbols of the control message fields are mapped to the resource elements by using the starting position selected in block 508 and the repetition factor calculated in block 504 for CQI and in block 506 for ACK/NACK.

FIG. 6 illustrates the result of the process of FIG. 5, when N=36, $N_{CQI}$=7, and $N_{AN}$=4. Accordingly, the repetition factor $R_{CQI}$ becomes 5 (36/7=5.143~5) according to Equation (2) and RAN becomes 7 ((36−7)/4=7.25~7). The starting position of CQI is selected to be 0, and the starting position of ACK/NACK is selected to be 2 (sub-carrier indices). Now, a CQI symbol is mapped to every fifth sub-carrier, starting from sub-carrier 0, and an ACK/NACK symbol is mapped to every seventh non-CQI sub-carrier starting from sub-carrier 2. The number of CQI symbols was excluded in Equation (3), and so they are excluded when carrying out the actual mapping. After all, it is difficult to find repetition factors that will never overlap, and the present procedure ensures that the ACK/NACK will primarily avoid puncturing a previously mapped CQI symbol. In case of depletion of data symbols that can be punctured, ACK/NACK may puncture also CQI symbols, because reliable transmission of the ACK/NACK message prevails over the transmission of the CQI message. In general, no subsequently mapped control message symbol will be mapped to the same sub-carrier as a control symbol mapped previously, because the mapped resource elements are excluded from further mapping. The mapping may be carried out in the resource element mapping block 204 of the transmitter, and a similar operation is carried out in the resource element mapping removal block 222 of the receiver so that the demapping is carried out correctly.

The actual mapping may be carried out in several ways. The same mapping pattern may be repeated for every OFDM symbol, i.e. the same control fields may occupy the same sub-carriers from one OFDM symbol to another. The size of a given control message field and the overall size of the control message fields may be made variable from symbol to symbol. In another embodiment, a different starting position is selected for consecutive OFDM symbols so as to obtain a staggered mapping of control message fields in consecutive OFDM symbols. This improves the frequency diversity between consecutive OFDM symbols, because the control message field occupies different frequency positions in different OFDM symbols. Alternatively, the interleaving may be carried out over all the sub-carriers and a plurality of OFDM symbols, e.g. over symbols in the time slot or sub-frame. Now, when mapping a given control message field, the sub-carrier of the previous OFDM symbol that was mapped last is taken into account when starting mapping the sub-carriers of the subsequent symbol. For example, if the number of sub-carriers is 36, as in FIG. 6, the sub-carrier index mapped last is 34, and the repetition factor is 6, the first sub-carrier mapped in the subsequent OFDM symbol has index 4. Now, depending on the number of sub-carriers and the repetition factors, different control message fields may occupy different sub-carriers in consecutive OFDM symbols.

In a yet alternative embodiment, the interleaving may be carried out over different spatial streams. As mentioned above, it is expected that user terminals are equipped with capability to support SU-MIMO, in which case multiple spatial transmission streams may be allocated to the user terminal. In such a case, the transmission may be multiplexed into the multiple spatially parallel signal streams. In this case, the interleaving may be expanded to the multiple streams. The interleaving may be carried out, for example, by first mapping control symbols to a sub-frame of a first stream, then continuing the mapping to the second stream, and so on. The continuation of the mapping may be carried out in a similar manned to that between consecutive OFDM symbols so that, depending on the number of sub-carriers and the repetition factors, different control message fields may occupy different sub-carriers in different spatially parallel streams. Alternatively, the mapping of the subsequent spatial stream may be initialized to correspond to the mapping of the first spatial stream so that the starting position is the same in both streams. The number of additional symbols available due to the use of additional signal streams may obviously be taken into account also when calculating Equation (1) and the repetition factors. Equation (1) may be modified to accommodate the use of spatial multiplexing, as will be described later.

In an embodiment, the data symbols may be mapped to the resource elements before mapping ACK/NACK so that ACK/NACK will puncture data symbols. In this embodiment, first the interleaving pattern is determined for each control message field by calculating Equation (1), a repetition factor, and a starting position for each control message field. Then, the CQI and rank indicator symbols are first mapped to the resource elements according to the process of FIG. 5. Thereafter, data symbols may be mapped to the remaining resource elements. Then, the ACK/NACK may be allocated to their determined positions so that an ACK/NACK symbol punctures, i.e. takes the place of a data symbol. The reason for ACK/NACK puncturing data is that, in case the user terminal misses the reception of a downlink data packet, it is not aware of the presence of the ACK/NACK message field in the uplink sub-frame and, accordingly, cannot transmit the scheduled ACK/NACK message. Instead, it transmits data in those resource elements.

In a further embodiment, a determined number of sub-carriers at an edge of the frequency resource block may be excluded from mapping of control symbols. Typically, the sub-carriers at the edge of the frequency resource are more susceptible to the interference and, therefore, critical control data may be preferably mapped to the sub-carriers closer to the center frequency of the frequency resource. In practice, this may be carried out by setting the starting position sufficiently high and skipping mapping of the sub-carriers having an index higher than a determined threshold (the mapping skips to the next symbol). In case the mapping is continued in the subsequent OFDM symbol from the sub-carrier where the mapping was finished in the previous OFDM symbol, mapping of the sub-carriers having an index lower than another threshold may also be skipped.

Utilization of OFDM enables allocation of different transmission power values for different resource elements, because the resource elements will not be spread over the frequency spectrum, as in the SC-FDMA. In an embodiment, different transmission power offset values are assigned to the resource elements carrying the control message fields and the resource elements carrying the data traffic fields within an OFDM symbol. A higher transmission power may be assigned to at least some control message fields in the transmitter to ensure their correct reception in the receiver. Naturally different additional transmission power offsets may be assigned to different control message fields, depending on how critical signaling information they carry. A higher transmission power may be assigned to more critical control messages. The additional transmission power assigned to the control message fields may also depend on the modulation and coding scheme currently in use on the PUSCH. The lower the modulation order and the stronger the coding scheme in use, the lower the transmission power offset assigned to the control message fields, because it is considered that the interference-tolerant modulation and coding scheme compensate for the need for stronger transmission power.

When utilizing spatial multiplexing as a transmission scheme, the interleaving pattern may be taken into account in the additional signal streams, as mentioned above. The control message fields may be distributed equally to different spatial streams, or the size of control message fields may be defined separately for each spatial stream. This may depend on the indication of the CQI from the user terminal. If the user terminal transmits separate CQIs for each spatial stream, the base station may define different modulation and coding schemes for different spatial streams and, therefore, different number of bits may be transmitted in different spatial streams. This is typically enabled when different SU-MIMO spatial streams are coded with different spreading (or scrambling) codes. Otherwise, the same modulation and coding scheme is used for all streams, and an equal amount of control data may be allocated to different spatial streams. This is typically enabled when different SU-MIMO spatial streams are coded with the same spreading (or scrambling) code.

The SU-MIMO uplink transmission may be utilized to improve data rates with spatial multiplexing or to improve reliability of transmission through beamforming transmission where the transmitted signals are directed to those spatial channels providing the highest signal-to-noise properties. Furthermore, spatial multiplexing can be combined with beamforming. Another alternative is to use open loop transmit diversity transmission when essentially the same data is transmitted from all antennas with some pre-coding. As indicated above, the SU-MIMO transmission may be applied to both OFDM and SC-FDMA transmission, and the application of Equation (1) and the repetition factors and sub-carrier mapping in case of OFDM transmission has been described above. In the case of SC-FDMA transmission, the current SC-FDMA PUSCH structure illustrated in FIG. 3 may be utilized for all spatial streams. As described in the previous paragraph, the control message fields may be distributed equally to different spatial streams, or the size of the control message fields may be defined separately for each spatial stream on the basis of the modulation and coding scheme in use. The number of symbols to be used for a given control message field is calculated with Equation (1), and the sub-carrier mapping is carried out according to the pattern illustrated in FIG. 3.

According to an embodiment of the invention, at least part of the control data, e.g. ACK/NACK messages, may be transmitted by using beamforming or transmit diversity transmission, while the data traffic may be transmitted by using the spatial multiplexing. In fact, this means that the ACK/NACK is transmitted with the assumption that the channel rank is one and the data traffic is transmitted with the assumption that the channel rank is higher than one. Equation (1) may be modified to take into account the spatial multiplexing in a case where different ranks are determined for a control message type and traffic data. Equation (1) may be modified by adding an uplink-rank specific parameter $\Delta R_{D-C}$ which defines the ratio between the number of ranks of the traffic data and the control message field in question. For example, if the rank of the traffic data is two (two spatial streams) and the rank of the ACK/NACK message is one (beamforming or transmit diversity), $\Delta R_{D-C}$ is two (2/1). Equation (1) has the following form after this modification:

$$N_x = \left\lceil \frac{O \cdot \text{offset} \cdot \Delta R_{D-C} \cdot M_{SC}^{PUSCH} M_{symb}^{PUSCH}}{K_{bits}^{PUSCH}} \right\rceil \quad (4)$$

Without the modification, the correct number of symbols or sub-carriers would not be allocated to the control message field because of the different ranks. In order to utilize the beamforming or transmit diversity for the control message field, the same sub-carriers are preferably allocated to the control message field in the spatial streams so that the same control message symbol occupies the same sub-carrier in all spatial streams. Then, a signal processor carrying out the beamforming in the transmitter multiplies the symbol with a coefficient determined on the basis of the desired direction of the beam. A reverse operation is naturally performed in the receiver to enable reception of the symbol, i.e. a signal processor carrying out the beamforming in the receiver multiplies the signal streams received from multiple antennas by a coefficient determined on the basis of the determined spatial weighting, and the symbols transmitted on the same sub-carriers of different streams are combined.

Figures 6A, 6B, 7:
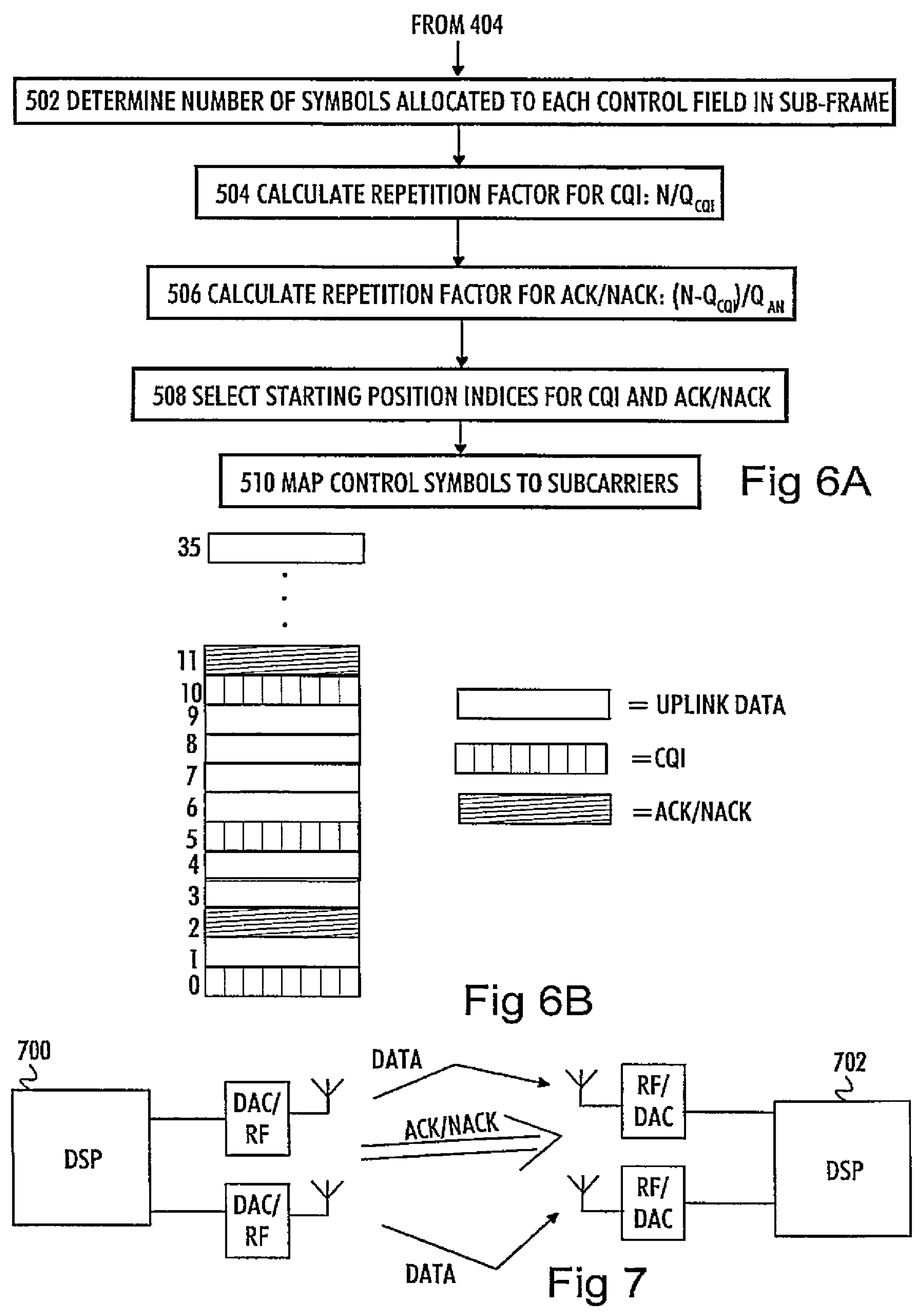
FIG. 6A illustrates a detailed process for control message field allocation according to an embodiment of the invention.
FIG. 6B illustrates the effect of the control message field allocation according to FIG. 6A.
FIG. 7 illustrates multi-stream transmission according to an embodiment of the invention.

FIG. 7 illustrates this embodiment where the ACK/NACK messages are transmitted from the transmitter to the receiver through a single spatial transmission stream by using the beamforming technique so as to direct the stream to a desired spatial channel. In other words, the same ACK/NACK message is transmitted from both antenna elements of the transmitter and the direction is controlled by phase-adjusting the signals transmitted from the different antennas, as known in the art. Corresponding phase adjustment is performed in the receiver so as to weight the received signals and, thus, amplify the spatial direction from which the ACK/NACK is mainly received. The data traffic is transmitted by using spatial multiplexing to achieve higher data rates, and different data is transmitted/received through different transmission/reception branches and antennas. In the transmitter and the receiver, the multi-antenna transmission is controlled by digital signal processors 700 and 702 designed for that purpose.

When the uplink transmission scheme is OFDM, the selection between beamforming, transmit diversity, and spatial multiplexing can be made on a sub-carrier level. In such a case, it is preferred that the same symbols are mapped to the same sub-carriers in each transmission branch in the transmitter, as noted above. When the uplink transmission scheme is SC-FDMA, the selection between beamforming, transmit diversity, and spatial multiplexing may be made on the SC-FDMA symbol level, because each sub-carrier occupies the whole frequency spectrum. The resolution of the selection between the beamforming, transmit diversity, and spatial multiplexing may be made for each SC-FDMA symbol or for a plurality of SC-FDMA symbols at a time, e.g. for a time slot or a sub-frame. If an SC-FDMA symbol carries a control message requiring high reliability, the SC-FDMA symbol may be transmitted by using beamforming or transmit diversity, and the same data is transmitted from all antenna branches in the transmitter and received through all antenna branches in the receiver. Then, the interleaving pattern determination and mapping of symbols to sub-carriers are made identically for all transmission/reception branches. On the other hand, if the SC-FDMA symbol carries information not requiring high reliability, the SC-FDMA symbol may be transmitted by using spatial multiplexing, i.e. multiple SC-FDMA symbols carrying different information may be transmitted simultaneously through different spatial streams.

Utilization of the beamforming in transmission of control messages typically requires feedback information on the channel properties from the receiver. When the feedback information is not available, an embodiment of the invention is to transmit at least part of the control message fields by using an open-loop multi-antenna transmit diversity scheme, e.g. space-time block coding, precoding vector switching, frequency-selection transmit diversity, or cyclic delay diversity with a large or small delay), in order to improve reliability of transmission of critical control information. The implementation of the open loop transmit diversity schemes listed above is obvious to one skilled in the art, and it does not require substantial modifications to the embodiments described above. The data traffic may be transmitted by using the spatial multiplexing in order to transmit the data traffic at a higher rate.

As indicated above, the embodiments of the present invention may be carried out in the transmitter (user terminal) and the receiver (base station). In fact, the embodiments are typically carried out by a processor or a corresponding apparatus included in the user terminal or the base station. The processor is configured to allocate the control message fields to the PUSCH resources according to the selected uplink transmission scheme so as to optimize transmission performance of the control messages in the selected uplink transmission scheme. The apparatus may be the processor 700, 702 as illustrated in FIG. 7. In case no multi-antenna transmission is utilized in the uplink transmission, the processor 700 of the user terminal simplifies in the sense that it does not carry out multi-antenna signal processing. The processor may be a logical component implemented by multiple physical signal processing units. The term 'processor' refers to a device that is capable of processing data. The processor may comprise an electronic circuit implementing the required functionality, and/or a microprocessor running a computer program implementing the required functionality. When designing the implementation, a person skilled in the art will consider the requirements set for the size and power consumption of the apparatus, the necessary processing capacity, production costs, and production volumes, for example. The processor may comprise logic components, standard integrated circuits, microprocessor(s), and/or application-specific integrated circuits (ASIC).

The microprocessor implements functions of a central processing unit (CPU) on an integrated circuit. The CPU is a logic machine executing a computer program, which comprises program instructions. The program instructions may be coded as a computer program using a programming language, which may be a high-level programming language, such as C, Java, etc., or a low-level programming language, such as a machine language, or an assembler. The CPU may comprise a set of registers, an arithmetic logic unit (ALU), and a control unit. The control unit is controlled by a sequence of program instructions transferred to the CPU from a program memory. The control unit may contain a number of microinstructions for basic operations. The implementation of the microinstructions may vary, depending on the CPU design. The microprocessor may also have an operating system (a dedicated operating system of an embedded system, or a real-time operating system), which may provide the computer program with system services.

The present invention is applicable to the cellular or mobile telecommunication system defined above but also to other suitable telecommunication systems. The protocols used, the specifications of mobile telecommunication systems, their network elements and subscriber terminals develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

What is claimed is:

1. A method performed by a user equipment, the method comprising:

determining a first number of coded symbols to be allocated to a first control message field in a physical uplink shared traffic channel (PUSCH) based on a first modulation and coding scheme (MCS) offset, wherein the first number of coded symbols is a function of at least: the first MCS offset, a number of bits of the first control message field, and a number of sub-carriers carrying the PUSCH, and further wherein the first number of coded symbols is directly proportional to the number of sub-carriers carrying the PUSCH; and transmitting, to a base station, the first control message field based on the first number of coded symbols.

2. The method of claim 1, further comprising:

determining a second number of coded symbols to be allocated to a second control message field in the PUSCH based on a second MCS offset; and transmitting the second control message field based on the second number of coded symbols.

3. The method of claim 2, wherein the first control message field is a hybrid automatic repeat request (HARQ) acknowledgement (ACK) field and the second control message field is either a rank indicator (RI) field or a channel quality indicator (CQI) field.

4. The method of claim 2, wherein the first control message field is a hybrid automatic repeat request (HARQ) acknowledgement (ACK) field and the second control message field indicates a channel quality.

5. The method of claim 3, wherein the first MCS offset is different than the second MCS offset.

6. The method of claim 4, wherein the first MCS offset is different than the second MCS offset.

7. The method of claim 1, wherein the first MCS offset corresponds to an offset between reception quality of traffic data transmitted in the PUSCH and control data transmitted in the first control message field.

8. The method of claim 1, wherein the first control message field is channel coded with a channel coding scheme corresponding to the first MCS offset.

9. The method of claim 1, wherein the first MCS offset is based on a selected transmission scheme, wherein the selected transmission scheme is selected from a plurality of transmission schemes including spatial multiplexing and transmit diversity.

10. A user equipment (UE) comprising:

a processor configured to determine a first number of coded symbols to be allocated to a first control message field in a physical uplink shared traffic channel (PUSCH) based on a first modulation and coding scheme (MCS) offset, wherein the first number of coded symbols is a function of at least: the first MCS offset, a number of bits of the first control message field, and a number of sub-carriers carrying the PUSCH, and further wherein the first number of coded symbols is directly proportional to the number of sub-carriers carrying the PUSCH; and a transmitter configured to transmit, to a base station, the first control message field based on the first number of coded symbols.

11. The UE of claim 10, wherein:

the processor is further configured to determine a second number of coded symbols to be allocated to a second control message field in the PUSCH based on a second MCS offset; and the transmitter is further configured to transmit the second control message field based on the second number of coded symbols.

12. The UE of claim 11, wherein the first control message field is a hybrid automatic repeat request (HARQ) acknowledgement (ACK) field and the second control message field is either a rank indicator (RI) field or a channel quality indicator (CQI) field.

13. The UE of claim 11, wherein the first control message field is a hybrid automatic repeat request (HARQ) acknowledgement (ACK) field and the second control message field indicates a channel quality.

14. The UE of claim 12, wherein the first MCS offset is different than the second MCS offset.

15. The UE of claim 13, wherein the first MCS offset is different than the second MCS offset.

16. The UE of claim 10, wherein the first MCS offset corresponds to an offset between reception quality of traffic data transmitted in the PUSCH and control data transmitted in the first control message field.

17. The UE of claim 10, wherein the first control message field is channel coded using a channel coding scheme corresponding to the first MCS offset.

18. The UE of claim 10, wherein the first MCS offset is based on a selected transmission scheme, wherein the selected transmission scheme is selected from a plurality of transmission schemes including spatial multiplexing and transmit diversity.

* * * * *